US008760782B1

(12) United States Patent
Garani et al.

(10) Patent No.: US 8,760,782 B1
(45) Date of Patent: Jun. 24, 2014

(54) METHODS AND DEVICES FOR JOINT TWO-DIMENSIONAL SELF-ITERATING EQUALIZATION AND DETECTION

(75) Inventors: Shayan S. Garani, Irvine, CA (US); Yiming Chen, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 41 days.

(21) Appl. No.: 13/404,380

(22) Filed: Feb. 24, 2012

(51) Int. Cl.
*G11B 20/10* (2006.01)
*H04L 27/06* (2006.01)

(52) U.S. Cl.
USPC ............................................ 360/39; 375/341

(58) Field of Classification Search
CPC .... G11B 27/36; G11B 5/012; G11B 2220/20; G11B 20/1426; G11B 5/09; H04L 1/0054; H04L 25/067; H03M 13/41; H03L 13/107
USPC ......... 360/39, 31, 40, 65, 45, 59.22; 375/341, 375/340, 348, 148, 262, 350, 229, 232, 375/233; 369/59.22
See application file for complete search history.

(56) References Cited

U.S. PATENT DOCUMENTS

| 7,555,070 B1 | 6/2009 | Ulriksson et al. |
| 7,788,572 B1 | 8/2010 | Ulriksson |
| 8,194,801 B1 * | 6/2012 | Bitran et al. ................... 375/341 |
| 8,582,223 B1 | 11/2013 | Garani et al. |
| 2006/0115029 A1 | 6/2006 | Marrow |

OTHER PUBLICATIONS

R. Wood, M. Williams, A. Kavcic, and J. Miles, "The Feasibility of Magnetic Recording at 10 Terabits Per Square Inch on Conventional Media," IEEE Trans. Magn., vol. 45, No. 2, pp. 917-923, Feb. 2009.
L. R. Bahl, J. Cocke, F. Jelinek and J. Raviv, "Optimal decoding of linear codes for minimizing symbol error rate," IEEE Trans. Inform. Theory., vol. 20, Mar. 1974, pp. 284-287.
E. Ordentlich and R. Roth, "On the Computational Complexity of 2D Maximum-likelihood Sequence Detection," Hewlett-Packard Labs, Palo Alto, CA, 2006, Tech. Rep. HPL-2006-69, 15 pgs.
J. K. Nelson, A. C. Singer, and U. Madhow, "Multi-directional Decision Feedback for 2D Equalization," in Proc. IEEE Intl. Conf. on Acoust. Speech and Signal Proc. ICASSP'04, vol. 4, May 2004, pp. 921-924.
Y. Wu, J. A. O'Sullivan, R. S. Indeck, and N. Singla, "Iterative Detection and Decoding for Separable Two-Dimensional Intersymbol Interference," IEEE Trans. Magn., vol. 39,, Jul. 2003, pp. 2115-2120.

(Continued)

*Primary Examiner* — Nabil Hindi

(57) ABSTRACT

A disk drive is configured to decode data written over a plurality of data tracks using joint self-iterating soft equalization and an iterative turbo 2-D MAP-based detection, by performing soft self-iterating linear 2-D MMSE equalization on received input samples; computing MMSE estimates for coefficients of a 2-D equalization filter based on a-priori values, mean of the a-priori values, the 2-D filter and the received input samples; updating the coefficients of the 2-D filter using a variance based on the a-priori values when carrying out a first iteration and based on an extrinsic LLR when carrying out subsequent iterations; determining values of the individual bits in the input samples using the updated coefficients; computing an output LLR of each individual received sample based on the computed MMSE estimate, the mean and the variance, and computing the extrinsic LLR by subtracting a priori LLR from the output LLR.

16 Claims, 14 Drawing Sheets

(56) References Cited

OTHER PUBLICATIONS

O. Shental, N. Shental, S. Shamai, I. Kanter, A. J. Weiss, and Y. Weiss, "Discrete-Input Two-Dimensional Gaussian Channels With Memory: Estimation and Information Rates via Graphical Models and Statistical Mechanics," IEEE Trans. Inform. Theory., vol. 54, Apr. 2008, pp. 1500-1513.

Y. Chen, T. Cheng, P. Njeim, B. Belzer, and K. Sivakumar, "Iterative Soft Decision Feedback Zig-Zag Equalizer for 2D Intersymbol Interference Channels," IEEE Jour. on Sel. Areas in Comm., vol. 28, Feb. 2010, pp. 1-14.

C. Berrou and A. Glavieux, "Near Shannon Limit Error-correcting Coding and Decoding: Turbo Codes," IEEE Trans. Comm., vol. 44, Oct. 1996, pp. 1064-1070.

S. G. Srinivasa, O. Momtahan, A. Karbaschi, S. W. McLaughlin, F. Fekri, and A. Adibi, "Volumetric Storage Limits and Space-Volume Multiplexing Tradeoffs for Holographic Channels," Opt. Eng., vol. 49, Jan. 2010, pp. 1-9.

C. L. Miller, B. R. Hunt, M. W. Marcellin, and M. A. Neifeld, "Image restoration using the Viterbi algorithm," Jour. of the Opt. Soc. of America A., vol. 17, No. 2, Feb. 2000, pp. 265-274.

M. Tuchler, R. Koetter and A. Singer, "Turbo equalization: Principles and New Results," IEEE. Trans. Comm., vol. 50, No. 5, pp. 754-767, May 2002.

S. Jeong and J. Moon, "Self-Iterating Soft Equalizer," accepted to IEEE. Trans. Communication, 6 pgs.

Steve Hranilovic, Member, IEEE, and Frank R. Kschischang, Fellow, "A Pixelated MIMO Wireless Optical Communication System", IEEE Journal of Selected Topics in Quantum Electronics, vol. 12, No. 4, Jul./Aug. 2006, pp. 859-874.

Chan Kheong Sann et al., "Channel Models and Detectors for Two-Dimensional Magnetic Recording (TDMR)", IEEE Transactions on Magnetics, vol. 46, No. 3, Mar. 2010, pp. 804-811.

X. Chen, K. M. Chugg, and M. A. Neifeld "Near-optimal data detection for two dimensional ISI/AWGN channels using concatenated modeling and iterative algorithms," in Proc. IEEE International Conference on Communications, ICC98, 1998, pp. 952-956.

M. Marrow, and J. K. Wolf, "Iterative Detection of 2-Dimensional ISI Channels," in Proc. Inf. Theory Workshop, Paris, France, pp. 131-134, Mar./Apr. 2003.

S. G. Srinivasa, and S. W. McLaughlin, "Capacity Bounds for Two-Dimensional Asymmetric M-ary (0, k) and (d,$) Runlength-Limited Channels," IEEE Trans. Comm., vol. 57, No. 6, pp. 1584-1587, Jun. 2009.

S. ten Brink, "Convergence behavior of iteratively decoded parallel concatenated codes," IEEE Trans. Commun., vol. 49, pp. 1727-1737, Oct. 2001.

Notice of Allowance dated Sep. 11, 2013 in U.S. Appl. No. 13/363,155, 14 pages.

U.S. Appl. No. 13/363,155; filed Jan. 31, 2012. 39 pages.

\* cited by examiner

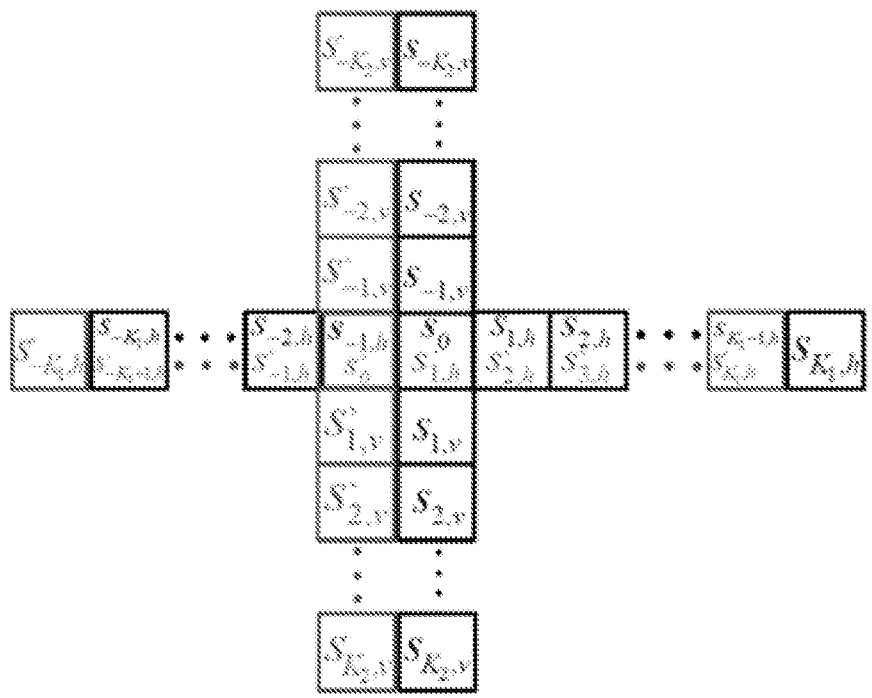

$$\begin{bmatrix} 0 & \cdots & \cdots & 0 & a_{-K_2} & 0 & \cdots & \cdots & 0 \\ \vdots & \ddots & & \vdots & \vdots & \vdots & & \ddots & \vdots \\ \vdots & & \ddots & \vdots & a_{-2} & \vdots & \ddots & & \vdots \\ 0 & \cdots & \cdots & 0 & a_{-1} & 0 & \cdots & \cdots & 0 \\ \beta_{-K_1} & \cdots & \beta_{-2} & \beta_{-1} & 1.0 & \beta_1 & \beta_2 & \cdots & \beta_{K_1} \\ 0 & \cdots & \cdots & 0 & a_1 & 0 & \cdots & \cdots & 0 \\ \vdots & \ddots & & \vdots & a_2 & \vdots & & \ddots & \vdots \\ \vdots & & \ddots & \vdots & \vdots & \vdots & \ddots & & \vdots \\ 0 & \cdots & \cdots & 0 & a_{K_2} & 0 & \cdots & \cdots & 0 \end{bmatrix}$$

*FIG. 7(a)*

*FIG. 7(b)* a-priori information from previous detector

US 8,760,782 B1

METHODS AND DEVICES FOR JOINT TWO-DIMENSIONAL SELF-ITERATING EQUALIZATION AND DETECTION

BACKGROUND

Two-dimensional (2-D) intersymbol-interference (ISI) channels have become practically relevant in various data recording technologies such as two-dimensional magnetic recording (TDMR), optical holographic memories as well as in other areas such as pixelated wireless optical channels and 2-D grid networks. From a signal processing viewpoint, data recording systems in 2-D have advantages over traditional 1-D systems. For example, 2-D recording systems are less sensitive to timing instabilities due to wider tracks and hence not restrictive to the size of sensory read elements. If 2-D ISI can be accurately accounted for during equalization and detection, significant Signal to Noise Ratio (SNR) gains are possible.

BRIEF DESCRIPTION OF THE DRAWINGS

FIG. 7, which includes FIGS. 7(a)-(d), shows a mask for a 2-D channel according to one embodiment.

DETAILED DESCRIPTION

Figure 1:
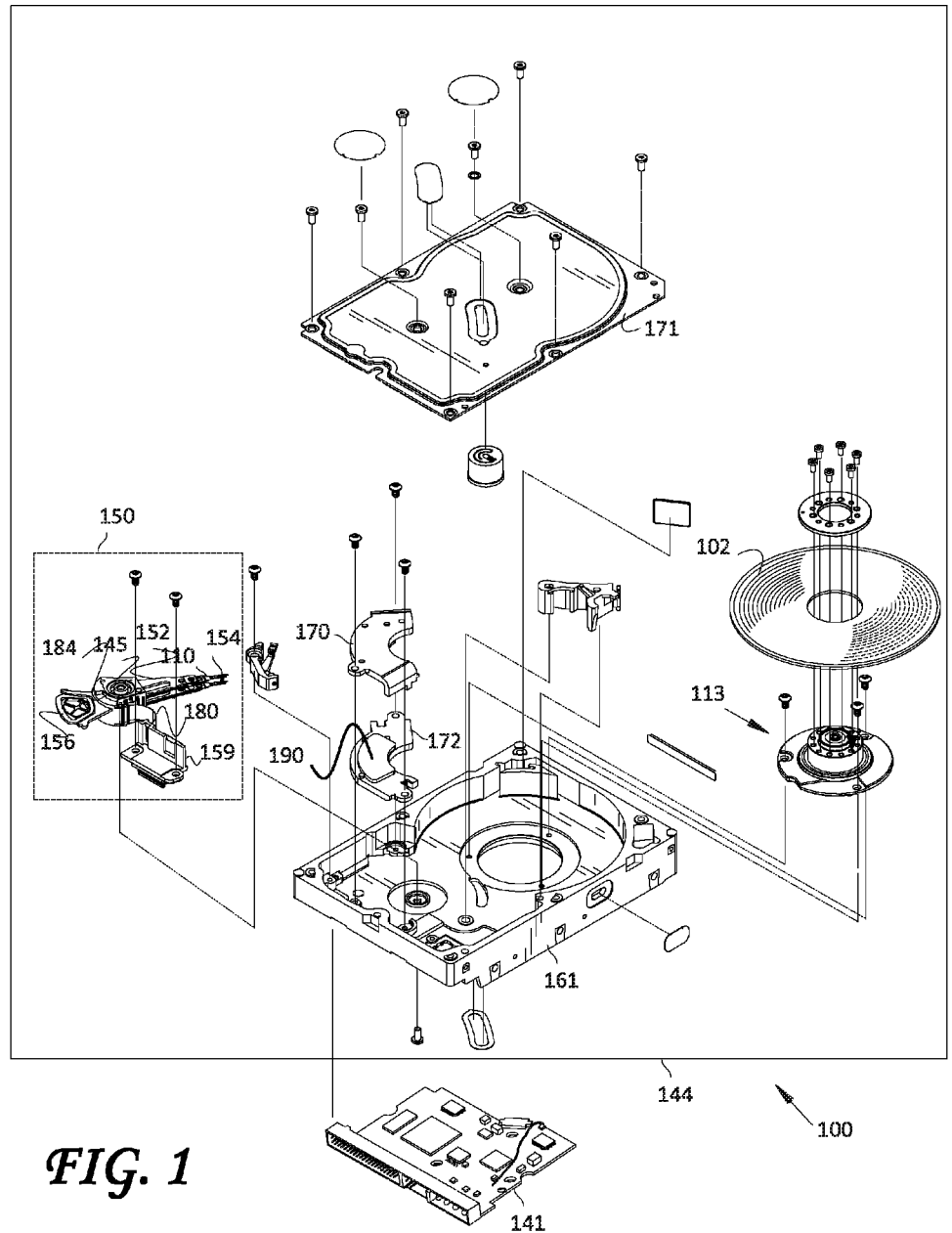
FIG. 1 shows the principal components of an exemplary magnetic disk drive constructed in accordance with one embodiment.

Magnetic data recording systems in 2-D, among other advantages, enable the tracking error over a desired row to be captured within the vicinity of neighboring rows. This makes 2-D systems less sensitive to timing instabilities than 1-D systems. Also, with an effective 2-D signal detection method operating over larger dimensions, guard bands can be eliminated between 2-D arrays. This improves the format efficiency of the magnetic media. These advantages motivate the development of 2-D signal processing techniques for combating ISI in magnetic disk drives. There is a wide spectrum of 1-D detection techniques ranging from decision feedback equalization (DFE) to the optimal MAP algorithm. Most 1-D techniques can be generalized to the 2-D case with an overhead in complexity. 2-D DFE based methods are easy to implement but suffer from error propagation. The 1-D MAP algorithm is theoretically optimal and is the best-in-class detector for minimizing bit-error rate. However, unlike 1-D MAP detection that can be easily realized, 2-D MAP detection is in general NP-complete. It is difficult to realize a 2-D trellis that spans signal dimensions greater than just a few bits. Low complexity 2-D signal detection algorithms based on 1-D schemes are needed to approach 2-D MAP detection performance. Several authors have considered various approaches towards 2-D detection. Nelson et al. (J. K. Nelson, A. C. Singer, and U. Madhow, "Multi-directional Decision Feedback for 2D Equalization," in Proc. IEEE Intl. Conf. on Acoust. Speech and Signal Proc. ICASSP '04, vol. 4, pp. 921-924, May 2004) derived a multi-dimensional decision feedback scheme for 2-D equalization. Wu et al. (Y. Wu, J. A. O'Sullivan, R. S. Indeck, and N. Singla, "Iterative Detection and Decoding for Separable Two-Dimensional Intersymbol Interference," IEEE Trans. Magn., vol. 39, pp. 2115-2210, July 2003) developed 2-D iterative detection and decoding scheme for a separable 2-D ISI system. However, in most practical systems, 2-D ISI is not separable. Shental et al. (O. Shental, N. Shental, S. Shamai, I. Kanter, A. J. Weiss, and Y. Weiss, "Discrete-Input Two-Dimensional Gaussian Channels With Memory: Estimation and Information Rates via Graphical Models and Statistical Mechanics," IEEE Trans. Inform. Theory., vol. 54, pp. 1500-1513, April 2008) developed a generalized belief propagation approach that achieves near ML performance for 2-D ISI channels. Simulations in Shental et al. considered (20×20) 2-D data sizes with smaller 2-D ISI masks (2×2) and low energy distribution on side taps; such cases are easily handled since nearby boundary conditions can aid the estimation algorithm. Further, this algorithm is more complex. In a recent prior work, Chen et al. (Y. Chen, T. Cheng, P. Njeim, B. Belzer, and K. Sivakumar, "Iterative Soft Decision Feedback Zig-Zag Equalizer for 2D Intersymbol Interference Channels," IEEE Jour. on Sel. Areas in Comm., vol. 28, pp. 167-180, February 2010) developed an iterative soft-decision feedback zig-zag MAP algorithm. This method demonstrated performance close to nearly optimal detection and compared well with the method in Shental et al.

Some embodiments are directed to methods and systems for decoding data, including but not limited to data stored in a data storage device such as a disk drive. FIG. 1 shows the principal components of an exemplary magnetic disk drive 100 constructed in accordance with one embodiment. With reference to FIG. 1, the disk drive 100 comprises a head disk assembly (HDA) 144 and a printed circuit board assembly (PCBA) 141. The HDA 144 includes a base 161 and a cover 171 attached to the base 161 that collectively house a disk 102 (or a stack of two or more such disks 102), a spindle motor 113 attached to the base 161 for rotating the disk 102, an HSA 150, and a pivot bearing cartridge 184 (such as a stainless steel pivot bearing cartridge, for example) that rotatably supports the head stack assembly (HSA) 150 on the base 161. The spindle motor 113 rotates the disk 102 at a constant angular velocity. The HSA 150 comprises a swing-type or rotary actuator assembly 152, at least one head gimbal assembly (HGA) 110 coupled to the load beam 303 that includes a flexure constructed as described above, and a flex circuit cable assembly. The rotary actuator assembly 152 includes a body portion, at least one actuator arm cantilevered from the body portion, and a coil portion 156 cantilevered from the body portion in an opposite direction from the actuator arm. The actuator arm supports the HGA 110 that, in turn, includes and supports the slider(s). The flex circuit cable assembly may include the flexible cable 180 and a flex clamp 159. The flexible cable 180 and the flexure of the HGA 110 are structured and coupled in the manner described above. The HSA 150 is pivotally secured to the base 161 via the pivot-bearing cartridge 184 so that the slider at the distal end of the HGA 110 may be moved over the surfaces of the disk(s) 102. The pivot-bearing cartridge 184 enables the HSA 150 to pivot about a pivot axis. The storage capacity of the HDA 144 may be increased by, for example, increasing the track density (the TPI) on the disk 102 and/or by including additional disks 102 in a disk stack and by an HSA 150 having a vertical stack of HGAs 110 supported by a rotary actuator assembly 152 having multiple actuator arms. The "rotary" or "swing-type" actuator assembly 152 rotates on the pivot bearing 184 cartridge about its pivot axis between limited positions and further includes a coil portion 156 that extends from one side of the body portion to interact with one or more permanent magnets 190 mounted to back irons 170, 172 to form a voice coil motor (VCM). The VCM causes the HSA 150 to pivot about the actuator pivot axis to cause the slider and the read-write transducers thereof to sweep radially over the disk(s) 102.

The PCBA 141 includes control circuitry configured to read data from and write data to the disk(s) 102. When reading data from the disk(s) 102, a read channel typically samples the read signal to generate sample values that are equalized into a target response (e.g., a target partial response). A sequence detector detects an estimated data sequence from the equalized samples. According to one embodiment, one or more components of the control circuitry of the PCBA 141 that handle the data channel may include a detector configured for joint 2-D equalization within a turbo-framework, as described and shown herein. According to one embodiment, the equalization is based on self-iteration principle. According to one embodiment, the detection is based on multi-track MAP detection with row/column detectors operating iteratively.

Channel Model

Let $\{x_{i,j}\}$ denote the 2-D input samples and $\{y_{i,j}\}$ denote the received samples. Let h denote the 2-D channel impulse response of memory (L×L). Let w(i, j) denote 2-D Gaussian noise samples with zero mean and variance $\sigma_w^2$. The output samples are obtained using the relation $$y(i, j) = \sum_{k,l} x(i-k, j-l)h(k, l) + w(i, j)$$

Self-Iterating 2-D Equalization

Figure 2:
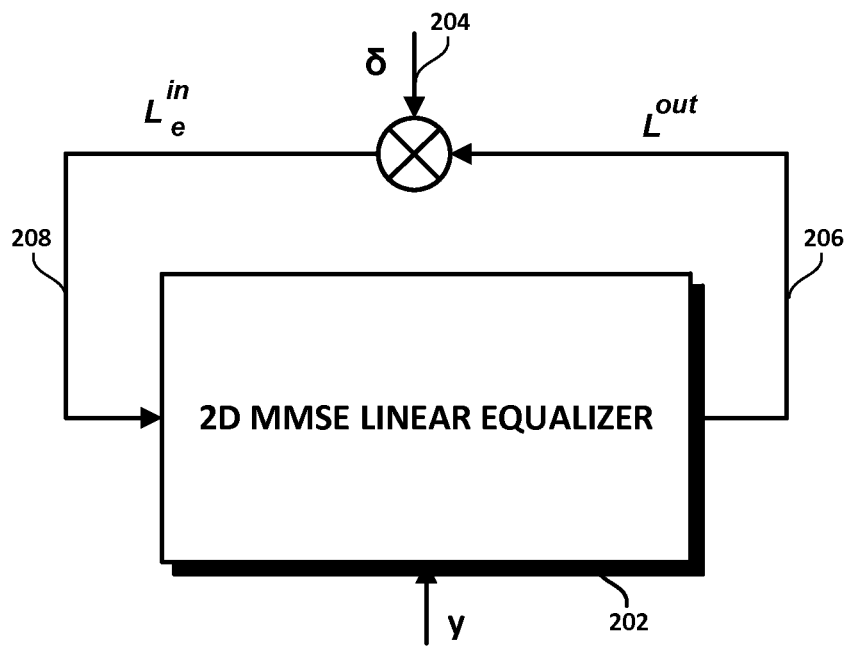
FIG. 2 shows a block diagram of a 2-D minimum mean-square error (MMSE) self-iterating equalizer, according to one embodiment.

FIG. 2 shows the block diagram of a 2-D minimum mean-square error (MMSE) self-iterating equalizer, according to one embodiment. The equalizer may be implemented as part of a detector implemented by the control circuitry described above in one embodiment. Initially, the a-priori values may all be initialized to zero. Subsequently, the equalizer 202 works by feeding the extrinsic information 208 back to itself. According to one embodiment, the equalizer 202 may be configured to stop after a predetermined number of inner iterations and/or convergence.

Let $\bar{c}$ denote the 2-D equalization filter of dimensions $(2N_1+1)\times(2N_1+1)$. In one embodiment, the MMSE estimate, from M. Tuchler, R. Koetter and A. Singer, "Turbo equalization: Principles and New Results," IEEE. Trans. Comm., vol. 50, pp. 754-767, May. 2002, is given by:

$$\hat{x}(i, j) = E(x_{i,j}) + \sum_{l_1,l_2}(y(i-l_1, j-l_2) - E(y(i-l_1, j-l_2)))c(i-l_1, j-l_2) \quad (1)$$
$$= m(i, j) + \bar{c}_{i,j}^T(\bar{y}_{i,j} - E(\bar{y}_{i,j}))$$

Here $m(i, j) = \tanh(0.5 L_e^{(in)}(i, j))$ is the mean and $v(i, j) = 1 - m^2(i, j)$ is the variance of the a-priori log likelihood ratio (LLR). $\bar{y}_{i,j}$ is a vector of dimensions $(2N_1+1)^2 \times 1$. According to one embodiment, the optimal coefficients for the equalizing filter $\bar{c}$ may be obtained using the Weiner-Hopf equation:

$$\bar{c}_{i,j} = K_{yx}^{-1} K_{yy} \quad (2)$$

$$K_{yy} = \sigma_w^2 I_{(2N_1+1)^2} + HV_{i,j}H^T \quad (3a)$$

$$K_{yx} = v(i,j)s^T \quad (3b)$$

where $s = H[0_{1\times(N_1+L-1)(2N_1+1+L)} 1 0_{1\times N_1 \times (2N_1+1+L)}]^T$ in equation (3b). Equations (1)-(3b) are the basic equations for 2-D equalization.

By using a-priori extrinsic information, the filter coefficients and output may, according to one embodiment, be modified for 2-D as follows:

$$\bar{c}_{i,j} = (\sigma_w^2 I_{(2N_1+1)^2} + HV_{i,j}H^T + (1-v(i,j))ss^T)^{-1}s \quad (4)$$

$$\hat{x}_{i,j} = c_{i,j}^T(y_{i,j} - Hm_{i,j} + m(i,j)s) \quad (5)$$

In one embodiment, the vector m(i, j) is the raster form of the expectation vector after reading elements of the array $\{m(i-l_1, j-l_2)\}$: $-N_1 \leq l_1, l_2 \leq N_1 + L - 1$ row wise.

The LLR_out 206 in FIG. 2 may be computed as $$L^{out}(x(i, j)) = \frac{2\hat{x}(i, j)\mu_{x(i,j)=1}}{\sigma_{x(i,j)=1}^2} \quad (6)$$

$$\mu_{x(i,j)=1} = xc_{i,j}^T s$$

$$\sigma_{x(i,j)=1}^2 = c_{i,j}^T(\sigma_w^2 I_{(2N_1+1)^2} + HV_{i,j}H^T - v(i, j)ss^T)c_{i,j}$$

A scaling factor (i.e. weight) 204 may be used to avoid quick convergence during iterations. For example, a scaling factor 204 of δ=0.5 may be used when feeding the extrinsic information back to the 2D MMSE Linear Equalizer 202.

Figure 3:
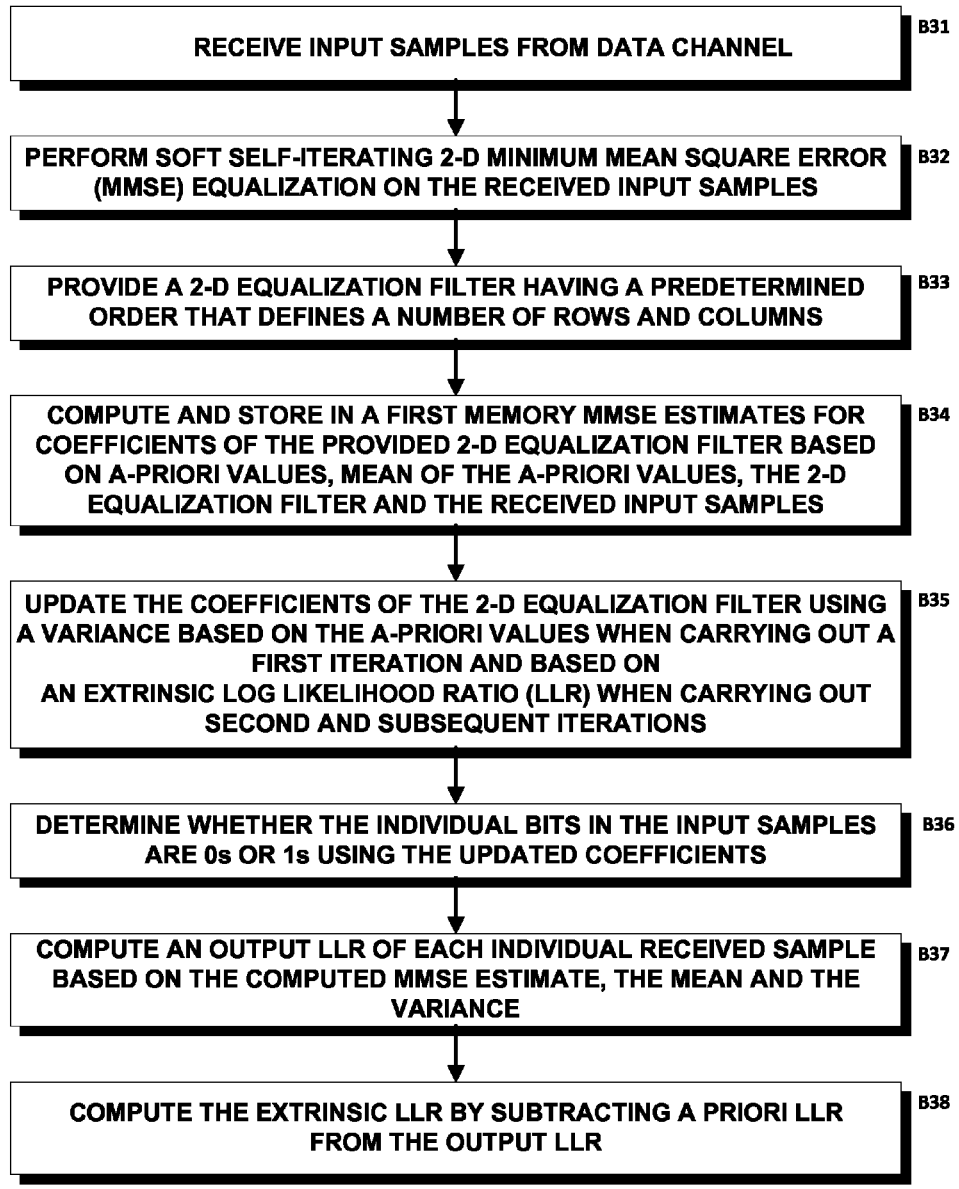
FIG. 3 is a flow chart of a computer-implemented method of decoding data written over a plurality of tracks of a disk of a disk drive using joint self-iterating soft equalization and an iterative turbo two-dimensional (2-D) maximum a-posteriori (MAP)-based detection, according to one embodiment.

FIG. 3 is a flow chart of a computer-implemented method of decoding data written over a plurality of tracks of a disk of a head disk drive using joint self-iterating soft equalization and an iterative turbo 2-D MAP-based detection, according to one embodiment. As shown therein, block B31 calls for receiving input samples from a data channel (e.g. data read from tracks of a disk). That is, the received signal may correspond to an input pixel of a current state from each of the plurality of tracks of the disk(s) 102 of FIG. 1. The received signal may be analog-to-digital converted, filtered through a Finite Impulse Response (FIR) filter and equalized to generate the equalized samples. As shown in block B32, a soft self-iterating linear 2-D minimum mean square error (MMSE) equalization may then be performed on the received input samples, as described relative to FIG. 2. As shown at block B33, a 2-D equalization filter may be provided, having a predetermined order that defines the size (number of rows and columns). MMSE estimates for coefficients of the provided 2-D equalization filter may then be computed and stored in a memory, based on a-priori values, mean of the a-priori values, the 2-D equalization filter and the received input samples, as shown at B34. Block B35 calls for the coefficients of the 2-D equalization filter to be updated. According to one embodiment, this update may be carried out using a variance based on the a-priori values when carrying out a first iteration, and based on an extrinsic LLR when carrying out second and subsequent iterations. At B36, it is determined whether the individual bits in the input samples are 0s or 1s using the updated coefficients. Block B37 calls for an output LLR of each individual received sample to be computed, based on the computed MMSE estimate, the mean and the variance. Lastly, in B38, the extrinsic LLR is computed by subtracting a priori LLR from the output LLR.

Figure 4:
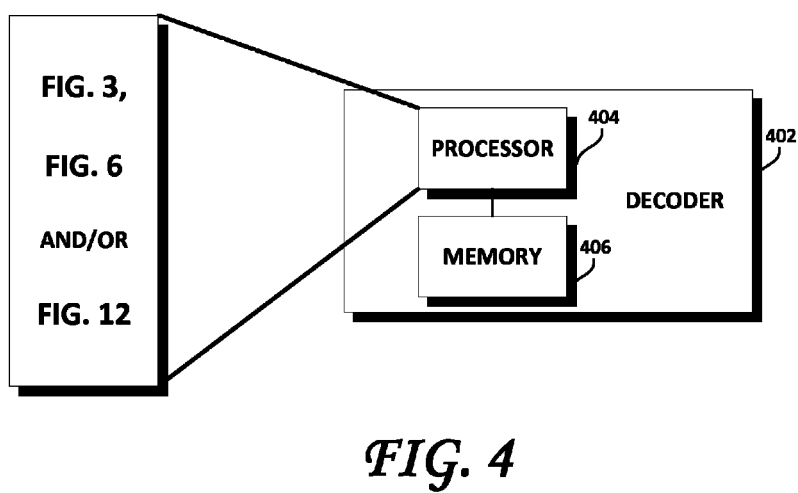
FIG. 4 is a block diagram of a decoder configured to decode data written over a plurality of tracks of a disk of a disk drive, according to one embodiment.

FIG. 4 is a block diagram of a decoder configured to decode data written over a plurality of tracks of a disk of a disk drive, according to one embodiment. As shown therein, the decoder 402 may include a memory 406 and a processor 404, the processor 404 being coupled to the memory 406. It is to be noted that the processor 404 may be any combination of hardware, software, and/or firmware that together execute the methods and functionality shown and described relative to FIGS. 3, 6 and/or FIG. 12 (described hereunder), as well as FIGS. 1-2, 4-11 and 13-14. In one embodiment, memory 406 may be located outside of the decoder 402 but in communication with the processor 404.

Simulation Example

For the purposes of simulation a selected 2-D mask is given by $$h = \begin{bmatrix} 0 & \alpha & 0 \\ \beta & 1 & \beta \\ 0 & \alpha & 0 \end{bmatrix}$$

and $\alpha=\beta=1/4$. The 2-D mask will be further described in conjunction with FIGS. 8 and 9.

The SNR may be defined as $$SNR = 10 \log_{10}\left(\frac{\|hx\|}{\sigma^2}\right)$$

Figure 5A:
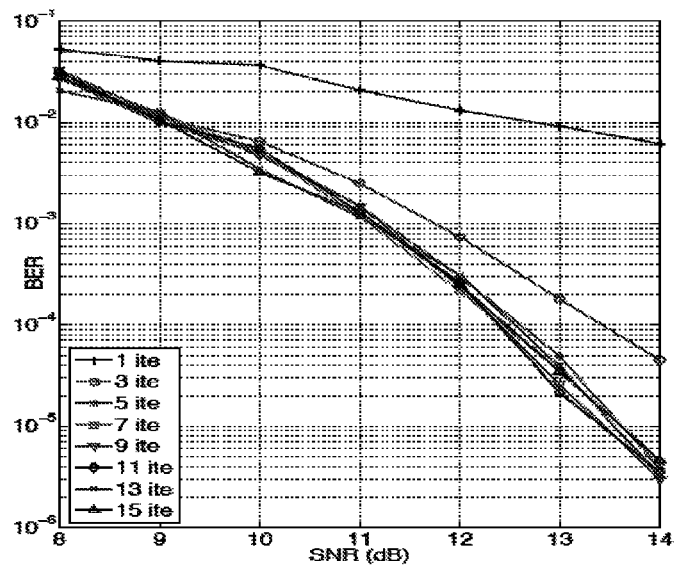
FIG. 5A is a graph showing 2-D self-iterating equalizer performance as a function of iterations, for a 3×3 equalization filter, according to one embodiment.

FIG. 5A is a graph showing 2-D self-iterating equalizer performance as a function of iterations (from 1 to 15 "ite" or iterations), for a 3×3 equalization filter, according to one embodiment. As shown, the graph of FIG. 5A plots bit error rate (BER) on the ordinate against SNR on the abscissa.

Figure 5B:
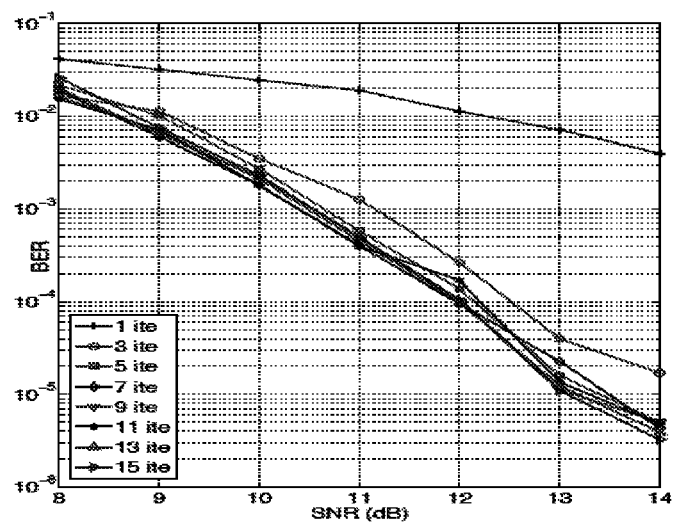
FIG. 5B is a graph showing 2-D self-iterating equalizer performance as a function of iterations, for a 5×5 equalization filter, according to one embodiment.

FIG. 5B is a graph showing 2-D self-iterating equalizer performance as a function of iterations (also from 1 to 15 "ite" or iterations), for a 5×5 equalization filter, according to one embodiment. The graph of FIG. 5B also plots BER on the ordinate against SNR on the abscissa. From FIGS. 5A and 5B, it is apparent that there are SNR gains from 2-D self-equalization, due to better decisions fed from inner iterations. Nearly a 3 dB gain can be realized by going from one inner iteration to five inner iterations. The gain on subsequent iterations is significantly smaller.

Joint 2-D Equalization and Detection

Figure 6:
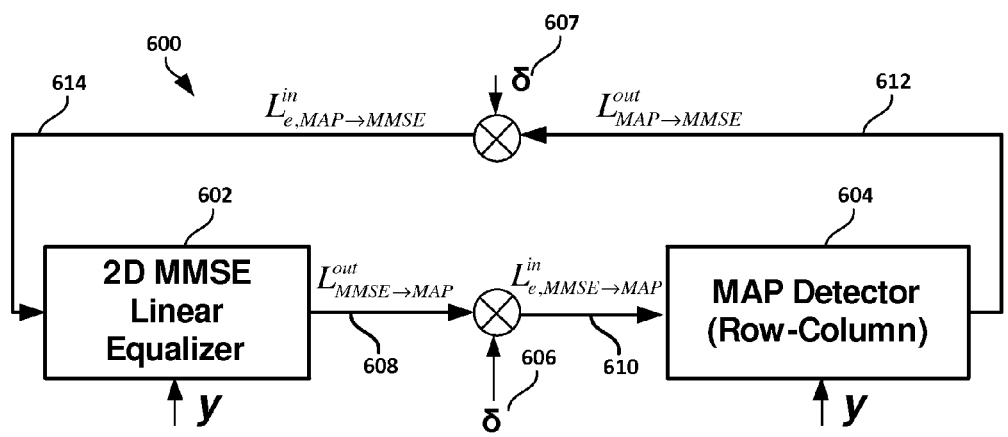
FIG. 6 shows a block diagram of an iterative 2-D turbo detector using joint 2-D equalization, according to one embodiment.

FIG. 6 shows a block diagram of an iterative 2-D turbo detector 600 using joint 2-D equalization, according to one embodiment. Both the equalizer and multi-track based MAP detector may carry out their local iterations while they are connected a turbo framework. The 2-D MMSE Linear Equalizer 602 and the Row-Column MAP detector 604 may be configured to pass soft extrinsic information (LLRs) between each other with LLR scaling (as shown at 606, 607) on the soft extrinsic information. Accordingly, in an iterative turbo-based detection embodiment, the output pixel LLR 608 (equation (6)) constitutes an output of the 2-D MMSE Linear Equalizer 602. According to one embodiment, the output pixel LLR 608 from the 2-D MMSE Linear Equalizer 602 may be converted into first extrinsic LLR 610 that is input to the Row-Column MAP detector 604 as a-priori information for the Row-Column MAP detector 604. The output pixel LLR 612 output from the Row-Column MAP detector 604 may then be converted into second extrinsic LLR 614 that is input back to the 2-D MMSE Linear Equalizer 602 as a-priori information for the 2-D MMSE Linear Equalizer 602, as shown. Additional iterations may follow the same pattern. According to one embodiment, the output of the 2-D MMSE Linear Equalizer 602, the output pixel LLR 608, may be scaled or weighted by a first weighting factor 606 to generate the first extrinsic LLR 610 and the output of the Row-Column MAP detector 604, the output pixel LLR 612, may be scaled or weighted by a second weighting factor 607 to generate the second extrinsic LLR 614.

The scaling factor (i.e. weight) on the extrinsic information (LLRs) may be used to avoid quick convergence between the detector and the equalizer during joint iterative equalization and detection. According to one embodiment, the weights 606, 607 may be set at, for example, 0.5. The weights δ 606, 607 may be effective to lower the magnitude of the 'bad' LLRs with high magnitude in opposite polarity that may propagate into the next detection cycle. In one embodiment, the performance tends to converge after several turbo iterations.

In the turbo embodiment, the log-likelihood ratio L(i, j) may be split into a term that depends on the incoming extrinsic information $L_e^{in}$ ($y_{i,j}$) to the current Row-Column MAP detector 604, and a term that does not. Hence, $L_e^{in}$ ($y_{i,j}$) may be subtracted from L(i, j) to form the extrinsic information $L^{out}$ (i, j) that may be passed to the next detector as the extrinsic information, such that $L^{out}$ (i,j)=L(i,j)−$L_e^{in}$ (i,j). This is also shown at block B38 in FIG. 3. The Row-Column MAP Detector 604 and/or the 2D MMSE Linear Equalizer 602 of FIG. 6 may be incorporated in the control circuitry of the PCBA 141.

The Row-Column MAP detector 604 of FIG. 6 may be most any suitable MAP detector. According to one embodiment, however, one or more components of the control circuitry of the PCBA 141 of FIG. 1 that handles the data channel may include a multi-row/multi-column MAP detector. Indeed, one embodiment is an iterative multi-row/multi-column MAP detector with 2-D ISI that accounts for feedback information from neighboring bit cells outside the 2-D ISI span. One other embodiment is a 2-D iterative multi-row/column turbo-detector that is a low complexity 2-D detection containing two 1-D optimal detectors operating in orthogonal directions based on a turbo principle. Single row/column and multi-row/column variations are further illustrated in some embodiments. The trellis of the multi-row/column detector is compliant with the span of the 2-D ISI, while the single-row/column version is approximated by a simplified 1-D MAP trellis with much lower complexity.

Considering the detection of an M×N equiprobable 2-D independent and identically distributed (i.i.d.) binary signal x with elements $x(k, l) \in (-1, +1)$ from received image y with elements $$y(m,n) = g(m,n) + w(m,n) \quad (7)$$

where g(m, n) is the 2-D convolution, defined as $$g(m,n) = \sum_k \sum_l h(m-k, n-l) x(k,l) \quad (8)$$

In the above equations h(k, l) are the elements of a 2-D finite impulse response/2-D blurring mask and w(m, n) are zero mean independent and identically distributed i.i.d. Gaussian random variables (r.v.s). The double sum is computed over the support of h(m−k, n−l): S(m, n)={(k, l): h(m−k, n−l)≠0}. The discrete model in (7) and (8) is applicable to many 2-D ISI channels post front-end signal processing after dealing with channel/media distortions and whitening the media noise.

Figure 7C:
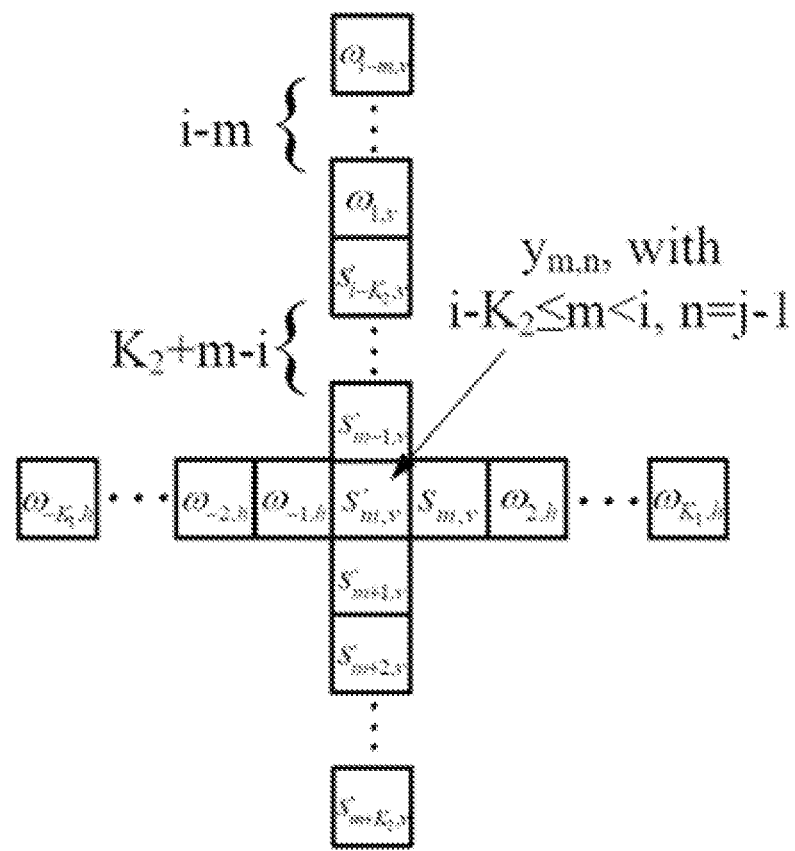
Figure 7D:
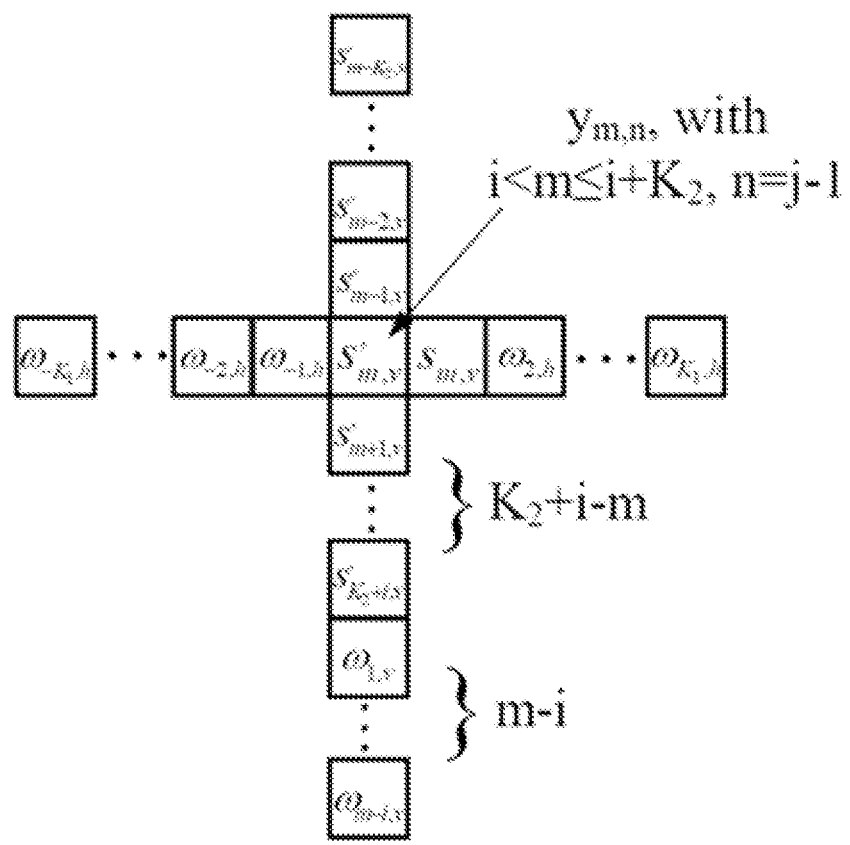

FIG. 7, which includes FIGS. 7(a)-(d), shows a mask for a 2-D channel, according to one embodiment. A generalized rectangular-shaped mask is shown in FIG. 7(a). The coefficients in the horizontal direction, i.e. $[\beta_{-K_1}, \ldots, \beta_{-1}, 1, \beta_1, \ldots, \beta_{K_1}]$ denote horizontal ISI; and the coefficients in the vertical direction, i.e. $[\alpha_{-K_2}, \ldots, \alpha_{-1}, 1, \alpha_1, \ldots, \alpha_{K_2}]$ denote vertical ISI. The size of this mask is $(2K_2+1) \times (2K_1+1)$. The coefficients with negative indices denote the causal part (i.e. the pre-cursor ISI); while the positive indices denote the anti-causal part (i.e. the post-cursor ISI). FIG. 7(b) shows the state definition and states transition (the previous state $S_{j-1}$=s' and the current state $S_j$=s) of the MAP trellis, 'h' denotes the horizontal direction and 'v' denotes the vertical direction. FIG. 7(c) shows the expectation computation for sample $y_{m,n}$ from received vector $\underline{y}_{i,j}$ with $i-K_2 \le m<i$ and n=j−1. Lastly, FIG. 7(d) shows expectation computation from sample $y_{m,n}$ from received vector $\underline{y}_{i,j}$ with $i<m \le i \pm K_2$ and n=j−1.

According to one embodiment, the shape of the 2-D mask may be selected so as to emphasize ISI contributions of adjacent pixels in the orthogonal directions over adjacent pixels in the diagonal directions. A 'pixel', as referred to herein, is a 2-D bit cell related to a 2-D sector or a bit cell in shingled magnetic recording, unlike the term "pixel" as used in cameras and imaging. Practical 2-D ISI channels in recording systems may be represented by the mask shown in FIGS. 7(a), (b) and (c), according to one embodiment. The mask, however, may be selected to have a shape that emphasizes ISI contributions of adjacent pixels in the radial directions (for example, in hexagonal ISI due to hyper track recording in bit patterned media). In practice, the span of interference in each orthogonal direction i.e., ($K_1$ and $K_2$) is small. Diagonal interference may be sufficiently small as to be negligible. Therefore, as shown in FIGS. 7(a), (b) and (c), the 2-D ISI mask may be selected herein with zero coefficients along the diagonals. However, it is to be understood that the coefficients along the diagonals may be non-zero to account for non-zero diagonal interference without departing from the scope of the embodiments disclosed herein.

As in the conventional BCJR algorithm described in L. R. Bahl, J. Cocke, F. Jelinek, and J. Raviv, "Optimal decoding of linear codes for minimizing symbol error rate," IEEE Trans. Inform. Theory., vol. 20, pp. 284-287, March 1974), scans based on the forward-backward procedure may be carried out. In one embodiment, to compute the received image y, a boundary of −1 pixels is assumed around x; the detector uses this boundary condition so that the MAP trellis can begin and end in an 'all −1' state as demonstrated in Bahl et al., in which '−1' is the bi-polar mapping of an all zero logical state.

For the generalized 2-D mask shown in FIG. 7(a), given the trellis state $$S_j = s \triangleq [s_{-K_2,v}, \ldots, s_{-1,v}, s_{1,v}, \ldots, \\ s_{+K_2,v}, s_0, s_{-K_1,h}, \ldots, s_{-1,h}, s_{1,h}, \ldots, s_{+K_1,h}], \quad (9)$$

the input vector $$\underline{u}_{i,j} = [u_{i-K_2,j}, u_{i-K_2+1,j}, \ldots, u_{i-1,j}, u_{i,j+K_1}, u_{i+1,j}, \ldots, u_{i+K_2-1,j}, u_{i+K_2,j}], \quad (10)$$

and the received vector sequence $\underline{Z}^{(i)} \in \{\underline{y}_{i,j}\}_{1 \le j \le N}$, where the vector $\underline{y}_{i,j}$ is the local received samples for trellis stage j at ith row, defined as:

$$\underline{y}_{i,j} = [y_{i-k_2,j-1}, y_{i-k_2+1}, \ldots, y_{i-1,j-1}, \\ y_{i,j}, y_{i+1,j-1}, \ldots, y_{i+K_2-1,j-1}, y_{i+K_2,j-1}], \quad (11)$$

and $$\lambda_{i,j}^{\underline{u}_{i,j}}(s)$$

is defined as $$\lambda_{i,j}^{\underline{u}_{i,j}}(s) \triangleq P(\underline{u}_{i,j}, S_j = s, \underline{Z}^{(i)}) \quad (12)$$

The a-posteriori probability may now be computed for this multi-row detector as $$P(\underline{u}_{i,j} | \underline{Z}^{(i)}) = \sum_s \lambda_{i,j}^{\underline{u}_{i,j}}(s) / P(\underline{Z}^{(i)}) \quad (13)$$

using a modified BCJR algorithm.

As in L. R. Bahl, J. Cocke, F. Jelinek and J. Raviv, "Optimal decoding of linear codes for minimizing symbol error rate," IEEE Trans. Inform. Theory., vol. 20, pp. 284-287, March 1974, the following may be defined:

$$\alpha_{i,j}(s) = P(S_j = s, \{\underline{y}_{i,a}\}_{1 \le a \le j}),$$

$$\beta_{i,j}(s) = P(\{\underline{y}_{i,a}\}_{j+1 \le a \le N} | S_j = s)$$

$$\gamma_{i,j}(s',s) = P(S_j = s, \underline{y}_{i,j} | S_{j-1} = s') \quad (14)$$

the state transition probability γ may be computed at every stage along the trellis, and after all the γ's are available, the α's and β's may be updated based on the following equations using the forward-backward recursion, $$\alpha_{i,j}(s) = \sum_{s}' \alpha_{i,j-1}(s')Y_{i,j}(s',s), \qquad (15)$$

$$\beta_{i,j-1}(s') = \sum_{s} \beta_{i,j}(s)Y_{i,j}(s',s), \qquad (16)$$

After all the α's, β's and γ's become available, the γ probability in equation (12) may be computed as, $$\lambda_{i,j}^{u_{i,j}} = \sum_{s}' \alpha_{i,j-1}(s')Y_{i,j}(s',s)\beta_{i,j}(s) \qquad (17)$$

To estimate the pixel located at $(i, j+K_1)$ from the λ's, the λ's may be marginalized over all the other pixels in the input vector $\underline{u}_{i,j}$ as, $$\lambda_{i,j-K_1}^{u_{i,j}}(S_{j-K_1}) = \sum_{\underline{u}_{-i,j-K_1} u_{i,j}} \lambda_{i,j-K_1}^{u_{i,j-K_1}}(S_{j-K_1}) \qquad (18)$$

The delay of $K_1$ of the index accounts for the ISI shape and boundary conditions.

The output pixel LLR may be computed as:

$$L(i,j) = \ln\left(\frac{\sum_{S_{j-K_1}} \lambda_{i,j-K_1}^{u_{i,j}=+1}(S_{j-K_1})}{\sum_{S_{j-K_1}} \lambda_{i,j-K_1}^{u_{i,j}=-1}(S_{j-K_1})}\right) \qquad (19)$$

From Equation (19), if $L(i, j)>0$ pixel $(i, j)$ may be detected as +1; otherwise pixel $(i, j)$ may be detected as −1.

The conditional probability $\gamma_{i,j}(s', s)$ is decomposed to the product of two other conditional probabilities based on Bayesian rule:

$$\gamma_{i,j}(s',s) = P(S_j=s, \underline{y}_{i,j} | S_{j-1}=s') =$$
$$P(\underline{y}_{i,j} | S_j=s, S_{j-1}=s')P(S_j=s | S_{j-1}=s') =$$
$$P(\underline{y}_{i,j} | S_j=s, S_{j-1}=s')P(\underline{u}_{i,j}), \qquad (20)$$

The last equality holds in (20), because the input is the branch connecting two adjacent stages, and this vector determines the next state given the current state. For the noniterative detection embodiment, there is no a-priori information. It is assumed in that case that all the input pixels are equally likely when computing $P(\underline{u}_{i,j})$ in equation (20). Since the first conditional probability in the product of (20) is Gaussian distributed, it may be computed it as, $$P(\underline{y}_{i,j} | S_j=s, S_{j-1}=s') \approx \qquad (21)$$

$$P(y_{i,j} | S_j=s, S_{j-1}=s') \prod_{m=-K_2, m\neq 0}^{K_2} P(y_{i+m,j-1} | S_j=s, S_{j-1}=s') =$$

$$\frac{1}{\sqrt{2\pi}\sigma_w} \exp\left(-\frac{(y_{i,j} - \overline{y_{i,j}})^2}{2\sigma_w^2}\right)$$

$$\prod_{m=K_2, m\neq 0}^{K_2} \frac{1}{\sqrt{2\pi}\sigma_w} \exp\left(-\frac{(y_{i+m,j-1} - \overline{y_{i+m,j-1}})^2}{2\sigma_w^2}\right)$$

In one embodiment, in the second step of equation (21), it is assumed that all the conditional probabilities are statistically independent of each other. This may not be true for larger ISI spans, but this assumption is a reasonable practical approximation to realize the algorithm. For the conditional probabilities in equation (21), the expectations are computed based on the index (m, n) of the received sample y and the components of the 2D mask shown in FIG. 7(a). Given m=i and n=j, the expectation is, $$\overline{y_{m,n}} = s_0 + \sum_{p=-K_2, p\neq 0}^{K_2} \alpha_p s_{p,v} + \sum_{p=-K_1, p\neq 0}^{K_1} \beta_p s_{p,h} \qquad (22)$$

Given $i-K_2 \leq m < i$ and $n=j-1$, the expectation is, $$\overline{y_{m,n}} = s'_{m,v} + \sum_{p=1}^{K_2} \alpha_p s'_{m+p,v} + \sum_{p=1}^{K_2+m-i} \alpha_{-p} s'_{m-p,v} + \qquad (23)$$

$$\sum_{p=K_2+m-i+1}^{K_2} \alpha_{-p} \omega_{p-K_2-m+i,v} + s_{m,v}\beta_1 + \sum_{p=1}^{K_2} \beta_{-p}\omega_{-p,h} + \sum_{p=2}^{K_1} \beta_p \omega_{p,h}.$$

There are i−m feedback pixels in vertical direction, (i.e., $\omega_{1,v}$ through $\omega_{i-m,v}$), and $2K_1-1$ feedback pixels in the horizontal direction, (i.e., $\omega_{2,h}$ through $\omega_{K_1,h}$ and $\omega_{-K_1,h}$ through $\omega_{-1,h}$), as also shown in FIG. 7(c).

Given $i < m \leq i+K_2$ and $n=j-1$, the expectation is, $$\overline{y_{m,n}} = s'_{m,v} + \sum_{p=1}^{K_2} \alpha_p s'_{m+p,v} + \sum_{p=1}^{K_2+m-i} \alpha_{-p} s'_{m-p,v} + \qquad (24)$$

$$\sum_{p=K_2+m-i+1}^{K_2} \alpha_p \omega_{p-K_2-m+i,v} + s_{m,v}\beta_1 + \sum_{p=1}^{K_2} \beta_{-p}\omega_{-p,h} + \sum_{p=2}^{K_1} \beta_p \omega_{p,h}.$$

There are m−i feedback pixels in vertical direction, (i.e., $\omega_{1,v}$ through $\omega_{i-m,v}$), and $2K_1-1$ feedback pixels in the horizontal direction, (i.e., $\omega_{2,h}$ through $\omega_{K1,h}$ and $\omega_{-K1,h}$ through $\omega_{-1,h}$), as also shown in FIG. 7(d).

In one embodiment, the total number of the feedback pixels in the vertical direction is |i−m| which will change with the index m; while the total number of feedback pixels in the horizontal direction is a constant $2K_1-1$.

Figure 8:
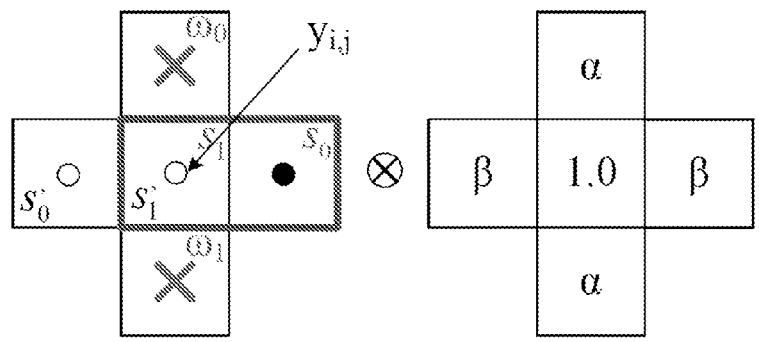
FIG. 8 shows the states, inputs and inner product definition for a simplified MAP trellis on a single row, according to one embodiment.

FIG. 8 shows the states, inputs and inner product definition for a simplified MAP trellis on a single row, according to one embodiment. In FIG. 8, $S_{j=\{s_o,s_1\}}$ and $S_{j-1=\{s'_o,s'_1\}}$. For a 3×3 mask as shown in FIG. 8, there are 5 state pixels contributing to 32 states configuration and 3 input pixels contributing to 8 branches in/out from one state of the trellis to the other. In FIG. 8, s' denotes the prior state and s denotes the next state. It is to be understood that other mask sizes such as, for example, 5×5, may be selected, albeit with higher complexity.

Figure 9:
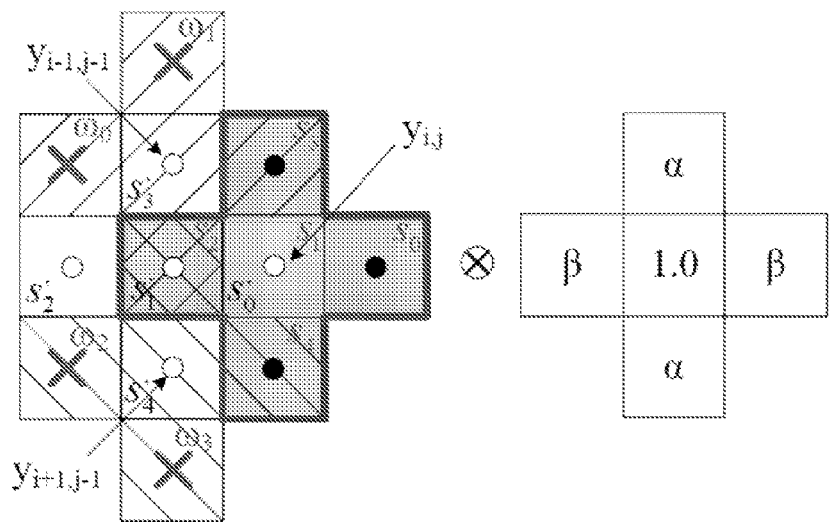
FIG. 9 shows the states, inputs and inner product definition for a MAP trellis on multi-rows, according to one embodiment.

FIG. 9 shows the states, inputs and inner product definition for a MAP trellis on multi-rows, according to one embodiment. The shape of the mask may be dependent on the layout of the tracks of the disk(s) 102. For instance, in hyper-track recording, the shape of the mask may be hexagonal, consistent with the written tracks. In the case of centered writing, the mask shape may be rectangular. According to one embodiment, the mask may be selected, for ISI considerations for data stored on adjacent tracks of a disk drive, to be a 2-D "cross-shape" type of mask, as shown in FIG. 9. According to one embodiment, the mask may be selected to have a hexagonal shape. The ISI may be chosen as a symmetric response for illustration purposes. This however does not restrict the embodiment, which may be extended to a more general case.

$$h = \begin{bmatrix} 0 & \alpha & 0 \\ \beta & 1 & \beta \\ 0 & \alpha & 0 \end{bmatrix}$$

The selection of the mask may include selecting a shape (through selection of the channel coefficients) so as to emphasize ISI contributions of adjacent pixels in an orthogonal direction over adjacent pixels in a diagonal direction. Accordingly, the channel coefficients at the corners of the channel model h above may be selected to be zero. Since the ISI is spanning 3 rows, a local span of 3 rows and 3 columns may be considered in one embodiment. In general, a 2-D trellis must span over the entire 2-D signal span and the forward backward technique must be computed at each point over the entire signal span. Thus, the worst case complexity is $N^4$ assuming an N×N size 2-D data sector.

Let $\{y_{i,j}\}$ denote the set of received samples. In reality for TDMR, these will be equalized samples post front-end signal processing. A 'pixel', as referred to herein, is a 2-D bit cell related to a 2-D sector or a bit cell in a shingled setup, unlike the term "pixel" as used in cameras and imaging. The current state is defined as the 2-D shape shown in thick lines in FIG. 9. In FIG. 9, the previous state is shown as 'o' circles. The overlap between the states is 2 pixels horizontally. The inputs will be the three elements $[s_0 s_3 s_4]$ that correspond to the bits at locations $[(i,j+1)(i-1,j)(i+1,j)]$ respectively. The pixels $[w_0 w_1]$ from locations $[(i-1,j-2)(i-2,j-1)]$ influence the pixel state at location (i−1,j−1). Similarly pixels/bits $[w_2 w_3]$ from locations $[(i+1,j-2)(i+2,j-1)]$ influence the pixel state at location (i+1,j−1). These pixels can be considered as feedback pixels. When the engine is run, usually feedback values are unknown. Hence the stand-alone non-iterative detector estimates the value of the pixel at locations (i−1,j−1) and (i+1,j−1) by marginalizing over the pixels around its vicinity that are outside the trellis. A boundary of all zero pixels bi-polar mapped to '−1' may be used so that trellis warm up and closure is appropriately handled.

Figure 10:
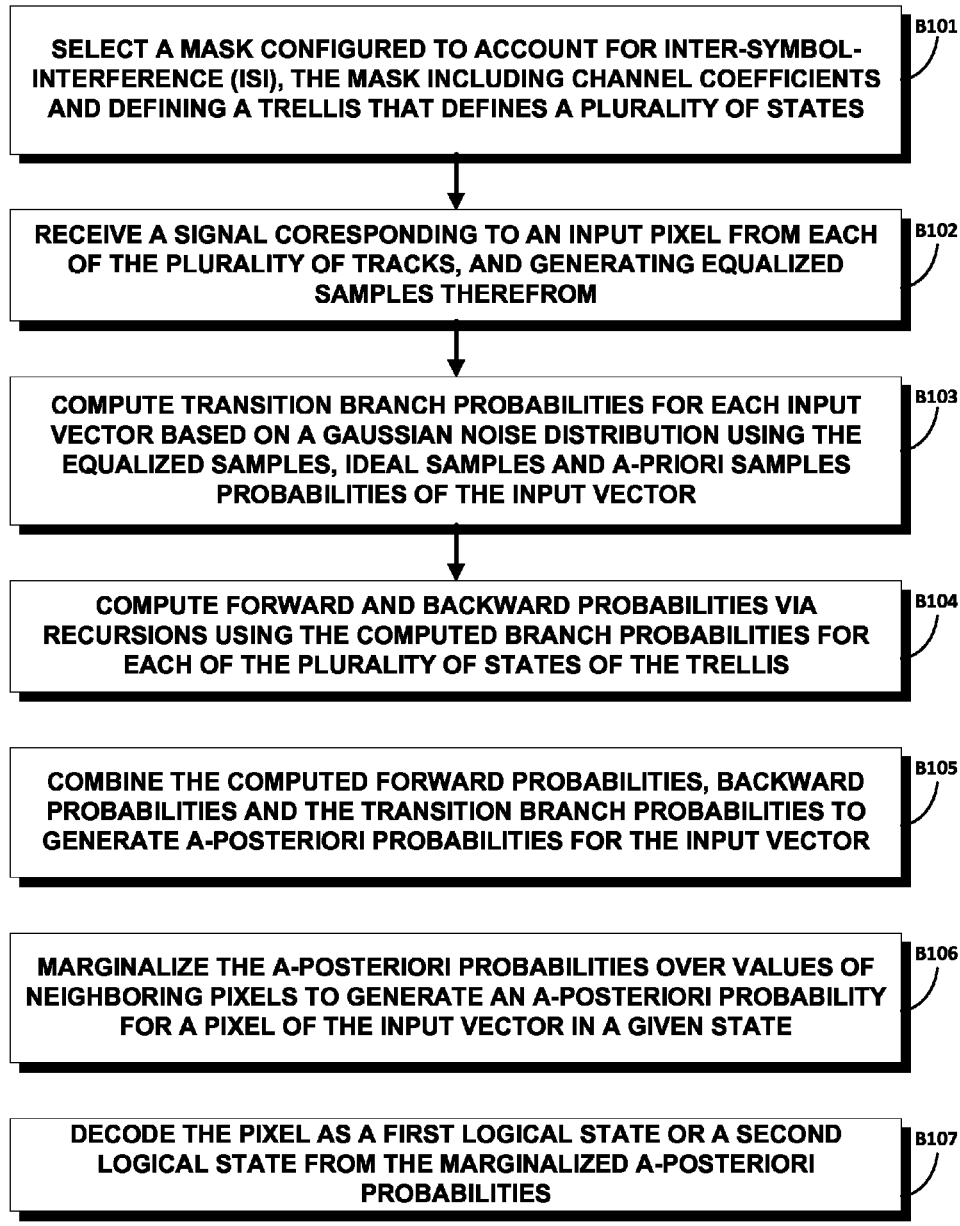
FIG. 10 is a flowchart for a computer-implemented method of decoding data written over a plurality of tracks of a disk of a disk drive, according to one embodiment.

FIG. 10 is a flowchart for a computer-implemented method of decoding data written over a plurality of tracks of a disk or disks (such as shown at 102 in FIG. 1) of a disk drive, according to one embodiment. As show therein, FIG. 10 includes a block B101 that calls for, as shown in FIGS. 7(a) through 7(d), selecting a mask configured to account for ISI. In one embodiment, the mask includes selected channel coefficients and defines a trellis that defines a plurality of states. As shown in Block B102, a signal is then received, and equalized samples are generated from the received signal. That is, the received signal may correspond to an input pixel of a current state from each of the plurality of tracks. The received signal may be analog-to-digital converted, filtered through a Finite Impulse Response (FIR) filter and equalized to generate the equalized samples.

Transition branch probabilities (from a current state s' to a next state s) may then be computed for each input vector based on a Gaussian noise distribution using the equalized samples, ideal samples and a priori probabilities of the input vector, as shown at Block B103. According to one embodiment, the ideal samples may be computed by convolving the input vector with a 2-D partial response target. Block B104 calls for computing forward and backward probabilities, according to equations (14), (15) and (16) above, via 2-D recursions using the computed transition branch probabilities for each of the plurality of states of the trellis. Each iteration of the recursion may utilize the results from the last recursion, as set forth in equations (15) and (16) above. As shown in block B105, the computed forward probabilities, backward probabilities and the transition branch probabilities may then be combined, to generate a-posteriori probabilities for the input vector, as defined in equation (17) above. As shown at block B106 and as defined in equation (18) above, the a-posteriori probabilities may then be marginalized over values of neighboring pixels to generate an a-posteriori probability for a pixel of the input vector in a given state. Finally, as called for by block B107 and as defined at equation (19), the pixel may be decoded as a first logical state (e.g., 0 or 1 in a binary system) or a second logical state (e.g., 0 or 1 in a binary system) from the marginalized a-posteriori probabilities.

According to one embodiment, the decoding in block B107 may be carried out by summing each of the plurality of states of the trellis corresponding to the pixel assuming a first value (such as −1, for example) and summing each of the plurality of states of the trellis corresponding to the pixel assuming a second value that is of opposite polarity as the first value (such as +1, for example). A ratio may then be calculated of a sum over most or all the states of the marginalized a-posteriori probabilities corresponding to pixels that are of the first value over a sum of most or all states corresponding to pixels that are of the second value, to obtain an output pixel log likelihood ratio (LLR). From the output pixel LLR (equation (19) above), the input pixel's value may be decoded as a first logical state if the output pixel LLR is greater than 0 and as a second logical state if the output pixel LLR is less than or equal to 0. For example, if the output pixel LLR of equation (19) evaluates to zero, the pixel may be decoded as having a first logical value (0, for example) and if equation (19) evaluates to a value that is greater than zero, the pixel may be decoded as having a second logical value (such as 1, for example).

Example Embodiments

Practical channels usually have small ISI span. For purposes of computational illustration, in one embodiment, a simple 2-D mask is chosen such that h=[0 α 0; β1 β; 0 α 0] of size 3×3, and assumed to be symmetric, as shown in FIGS. 8 and 9. For a trellis based on a 3×3 mask h, there are 5 state pixels (i.e., $s_0$ through $s_4$ in FIG. 9), contributing to 32 states configuration and 3 input pixels. The 3 input pixels lead to 8 branches coming into/going out from one state. Also, there are 4 feedback pixels ($\omega_0$, $\omega_1$, $\omega_2$, $\omega_3$), which may be used to compute the state transition probability in the BCJR process. The a-priori information for both the input pixels and the feedback pixels come from the previous detector. With no feedback, they can be assumed to be zero a-priori. With feedback, extrinsic information from the previous detector will be set as feedback, as discussed hereunder.

The branch metrics may be defined as the squared Euclidean distances (SEDs) between the branch output vectors and the received pixel vectors $\underline{y_{i,j}} \in [y_{i-1,j-1}, y_{i,j}, y_{i+1,j-1}]$. As shown in FIG. 9, $y_{i,j}$ corresponds to the position of $s_1$ or $s'_0$, while $y_{i-1,j-1}$ corresponds to the position of $s'_3$ and $y_{i-1,j+1}$ corresponds to $s'_4$.

Figure 11:
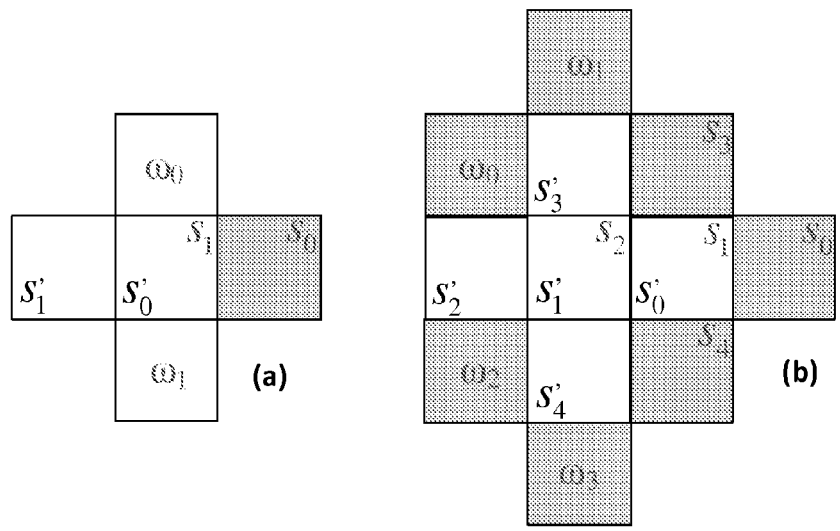
FIG. 11 is a simplified MAP trellis showing a-priori information from a previous detector and a MAP trellis also showing a-priori information from a previous detector, according to one embodiment.

For the 3×3 mask shown in FIG. 11, equation (21) may be modified as $$P(y_{i,j} | S_j = s, S_{j-1} = s') = \qquad (25)$$

$$\begin{cases} \text{For simplified MAP trellis} \\ \sum_{\omega_0 \omega_1} P(\omega_0) P(\omega_1) P(y_{i,j} | s, s', \overline{y_{i,j}}(\omega_0, \omega_1)) \\ \text{For MAP trellis (three-rows version)} \\ P(y_{i,j} | s, s', \overline{y_{i,j}}) \times \left[ \sum_{\omega_0, \omega_1} P(\omega_0) P(\omega_1) \right. \\ \left. P(y_{i-1,j-1} | s, s', \overline{y_{i-1,j-1}}(\omega_0, \omega_1)) \right] \times \\ \left[ \sum_{\omega_2, \omega_3} P(\omega_2) P(\omega_3) P(y_{i+1,j-1} | s, s', \overline{y_{i+1,j-1}}(\omega_2, \omega_3)) \right] \end{cases}$$

In equation (25), the expectations of the terms within the Gaussian conditional probabilities are computed based on the states definitions, the feedback pixels for the corresponding trellis and the 3×3 mask h, as shown in FIG. 9 as follows:

$\overline{y_{i,j}}(\omega_0, \omega_1) = s_1 + \alpha(\omega_0 + \omega_1) + \beta(s'_1 + s_0);$ $\overline{y_{i,j}} = s_1 + \alpha(s_3 + s_4) + \beta(s_0 + s_2);$ $\overline{y_{i-1,j-1}}(\omega_0, \omega_1) = s'_3 + \alpha(\omega_1, s'_1) + \beta(\omega_0 + s_3);$ $\overline{y_{i+1,j-1}}(\omega_2, \omega_3) = s'_4 + \alpha(\omega_3 + s'_1) + \beta(\omega_2 + s_4) \qquad (26)$ All the Gaussian probabilities above have the same variance.

The multi-row trellis shown in equation (25) processes three adjacent data tracks of the disk(s) 102 simultaneously. In the computation of $P(\underline{y}_{i,j}|S_j=s, S_{j-1}=s')$, $\underline{y}_{i,j}$ may be defined as $y_{i,j}=[y_{i-1,j-1}, y_{i,j}, y_{i+1,j-1}]$. For convenience, this non-iterative 2-D detection embodiment that processes three adjacent data tracks simultaneously is denoted 'algorithm B'.

However, for the 'one-row version' embodiment that only processes one single data track of the disk(s) 102, the trellis definition in FIG. 9 will only keep the central three rows, and all the feedback pixels will disappear, and only the expectation of $y_{i,j}$ is needed to compute the state transition probability. The computation in equation (25) may then be modified as:

$$P(y_{i,j} | S_j = s, S_{j-1} = s') = \frac{1}{\sqrt{2\pi}\sigma_\omega} \exp\left(-\frac{(y_{i,j} - \overline{y_{i,j}})^2}{2\sigma_\omega^2}\right) \qquad (27)$$

where the $y_{i,j}$ is just the received sample from one single data track, and $\overline{y_{i,j}} = s_1 + \alpha(s_3 + s_4) + \beta(s_0 + s_2)$. For convenience, this non-iterative 2-D detection embodiment that processes a single track is denoted as 'algorithm A'.

The relation between the 'one-row' version embodiment and 'three-rows' version embodiment may be also be generalized to arbitrary 2D ISI channels. In one or more embodiments, the best performance may be obtained by processing R adjacent rows (data tracks) simultaneously, where R=max (2K_1+1, 2K_2+1), but with the highest complexity.

Turbo Based Detection

One embodiment is based on a 2-D iterative scheme that takes advantage of different error decisions and noise distribution at the output of the row and column detectors. FIG. 11 is a simplified MAP trellis showing a-priori information from a previous detector and a MAP trellis also showing a-priori information from a previous detector, according to one embodiment. In FIG. 11, the pixels needing the a-priori information, for the simplified MAP trellis of part (a) of FIG. 11, are $S_j=\{s_0, s_1\}$ and $S_{j-1}=\{s'_0, s'_1\}$, and for the MAP trellis of part (b) of FIG. 11, are $S_j=\{s_0, s_1, s_2, s_3, s_4\}$ and $S_{j-1}=\{s'_0, s'_1, s'_2, s'_3, s'_4\}$. For a turbo based iterative embodiment, needed is the probability of the input pixel(s) (as part of the trellis), $s_0$ in part (a) of FIG. 11 and $s_0, s_3, s_4$ in part (b) of FIG. 11 and the probability of the feedback pixels (outside of the trellis), $w_0, w_i$ in part (a) of FIG. 11 and $\omega_0$ through $\omega_3$ in part (b) of FIG. 11. Scaled extrinsic information coming from the previous detector may be used in the iterative embodiment. When computing the probability of the corresponding pixels using the a-priori information (i.e., the probabilities of all the feedback pixels in equation (25) and $P(\underline{u}_{i,j})$ in equation (20)), it is assumed that the pixels are statistically independent.

According to one embodiment, to compute the a-priori probability for a specified pixel $y_{i,j}$ from the incoming extrinsic information of this pixel $L_e^{in}(y_{i,j})$, the following equations may be applied:

$$P(y_{i,j} = +1 | y_{i,j}) = \frac{\exp(L_e^{in}(y_{i,j}))}{\exp(L_e^{in}(y_{i,j})) + 1}; \qquad (28)$$

$$P(y_{i,j} = -1 | y_{i,j}) = \frac{1}{\exp(L_e^{in}(y_{i,j})) + 1};$$

where $y_{i,j}$ denotes the a-priori information on pixel $y_{i,j}$. For convenience, the iterative 2-D detection embodiment that computes γ's using the equation (25) taking account of the a-priori information for both the feedback pixels and $P(\underline{u}_{i,j})$ is denoted herein 'algorithm D' in Table 1 herein below and in FIG. 13. The iterative algorithm using only the a-priori information of the feedback pixels is denoted 'algorithm C'.

A state is defined comprising of two adjacent pixels $s_0$ and $s_1$ in the row direction as shown in FIG. 8; an input pixel that is the branch connecting two neighboring states determines the next state. To fit into the shape of a local 2-D ISI, two extra feedback pixels may be added ($\omega_0$, $\omega_1$) besides the pixels comprising of the trellis states and inputs. The state transition probability may be computed using the equation (25). The a-priori information on both the feedback pixels and $P(\underline{u}_{i,j})$ is used. This simplified scheme is referred to as 'algorithm E' in Table 1 and FIG. 13.

Figure 12:
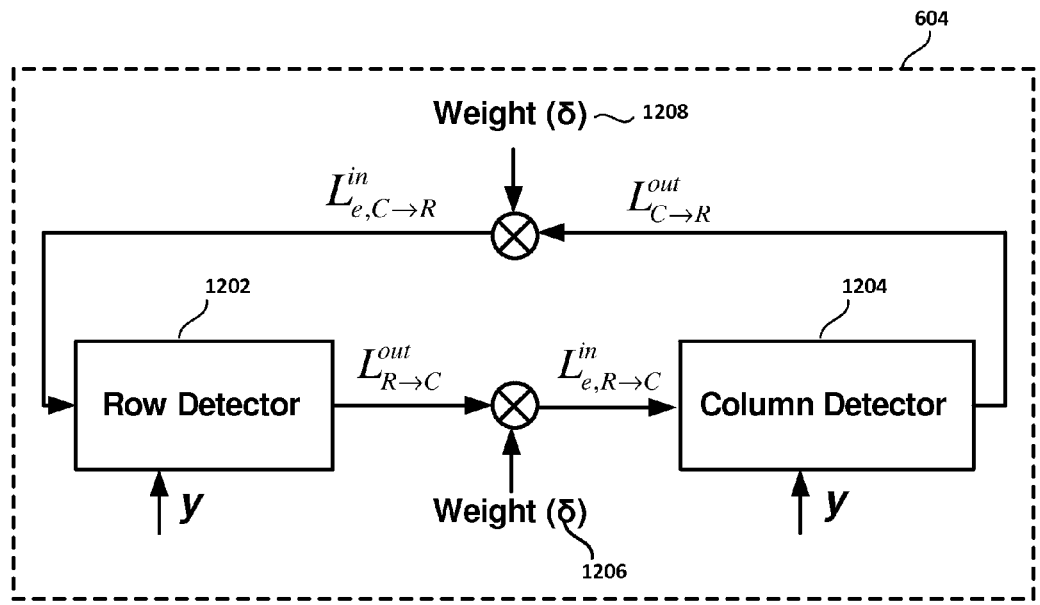
FIG. 12 shows a block diagram of an iterative 2-D turbo detector, according to one embodiment.

FIG. 12 shows a block diagram of an iterative 2-D turbo detector, according to one embodiment. The Row-Column MAP detector 604 of FIG. 6 may comprise the iterative 2-D turbo detector shown in FIG. 12, for example. As shown in FIG. 12, the row detector 1202 and the column detector 1204 pass soft extrinsic information (LLRs) between each other with LLR scaling on the soft extrinsic information. Accordingly, in an iterative turbo-based detection embodiment, the output pixel LLR (equation (19)) constitutes an output of a row detector 1202. According to one embodiment, a column detector may be configured to be similar to the row detector 1202, but for processing transposed equalized samples and a transposed mask. The output pixel LLR from the row detector 1202 may be converted into first extrinsic LLR that is input to the column detector 1204 as a-priori information for the column detector 1204. The output pixel LLR output from the column detector 1204 may then be converted into second extrinsic LLR that is input back to the row detector 1202 as a-priori information for the row detector 1202, as shown. Additional iterations may follow the same pattern. According to one embodiment, the output of the row detector 1202 may be scaled or weighted by a first weighting factor 1206 and the output of the column detector may be scaled or weighted by a second weighting factor 1208.

The scaling process (i.e. weight) on the extrinsic information (LLRs) may be used to avoid quick convergence during iterative detection. The weights δ 1206, 1208 may be effective to lower the magnitude of the 'bad' LLRs with high magnitude in opposite polarity that may propagate into the next detection cycle. The performance tends to converge after several turbo iterations.

In the turbo embodiment, the log-likelihood ratio L(i, j) may be split into a term that depends on the incoming extrinsic information $L_e^{in}(y_{i,j})$ to the current (row or column) detector 1202, 1204, and a term that does not. Hence, $L_e^{in}(y_{i,j})$ may be subtracted from L(i, j) to form the extrinsic information $L^{out}(i, j)$ that may be passed to the next detector as the extrinsic information, $$L^{out}(i,j)=L(i,j)-L_e^{in}(i,j) \quad (29)$$

The same process may be carried out for one or more of the iterative 2-D detection embodiments disclosed herein.

Complexity Analysis

One embodiment is a low complexity 2-D detection algorithms employing 1-D MAP technique operating over rows and columns within a turbo iteration framework to realize a 'near true 2-D detection' performance. A size N×N binary source image may be used for complexity test. The length of the trellis within a single row is N. Operating over the entire image with N rows, the data may be processed N×N times. The complexity comparison between different algorithms is summarized in Table 1 below. The comparison unit is 'per detector per iteration', since some algorithms employ iterative schemes with more than one detector in a single iteration.

Simulation Results

Monte Carlo simulation of the 2-D detection algorithms were carried out and the results thereof compared. All simulations employ a random 64×64 binary source image x(m, n)∈{−1, +1}. All of the images have a boundary corresponding to the mask size, so that the trellis may start and end at an 'all −1' state. The Signal-To-Noise Ratio (SNR) may be defined as:

$$SNR = 10\log_{10}\left(\frac{\|hx\|^2}{\sigma_\omega^2}\right) \quad (30)$$

$$= 10\log_{10}\left(\frac{\sum_{i,j} h^2(i,j)}{\sigma_\omega^2}\right)$$

where $\sigma_w^2$ is the variance of the Gaussian r.v.s ω(m, n) in Equation (8). It is assumed that α=β in the 3×3 mask h, for simulation purposes.

TABLE 1

| Algorithm | Algorithm E | Algorithm A | Algorithm B | Algorithm D |
|---|---|---|---|---|
| add/subtract | 212 · N² | 4384 · N² | 10016 · N² | 14368 · N² |
| multiply/divide | 281 · N² | 5889 · N² | 15105 · N² | 19457 · N² |
| exp/log | 177 · N² | 257 · N² | 2305 · N² | 11009 · N² |

Computational Complexity Comparison of Different 2-D Detection Algorithms (with an N×N Binary Source Image and 3×3 ISI)

Iterative algorithms C and D employ a 5-iteration scheme with a weight σ=0.8 for extrinsic information scaling; while algorithm E uses a 10-iteration scheme with weight σ=0.5. The performance of the algorithms converges; i.e., no more significant SNR gain, after these numbers of iterations discussed herein. The three-row non-iterative version 'algorithm B' performs much better than the one-row version 'algorithm A', since the state transition probability in BCJR algorithm is computed more accurately (i.e. more contributing terms dealing with ISI rather than in the single case). Algorithms C and D spanning multi-rows/columns perform better than algorithm E with simplified trellis because handling multiple row/columns have better 2-D ISI cancellation than a single-row/column iterative detector.

Figure 13:
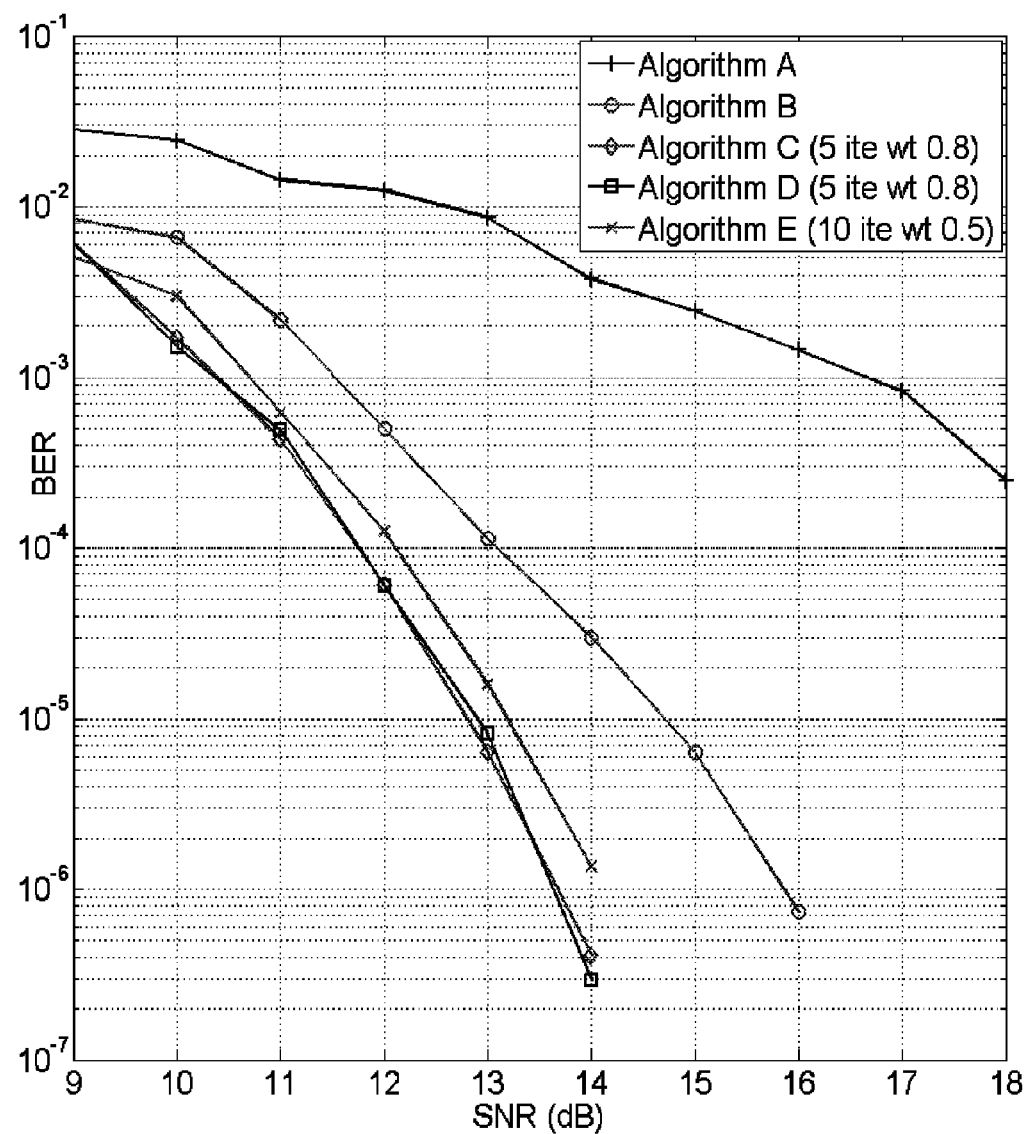
FIG. 13 is a graph showing the results of a Monte Carlo simulation for different detection embodiments for the iterative 2-D turbo detector of FIG. 12.

FIG. 13 shows the results of a Monte Carlo simulation for different detection embodiments. The SNR, in dB is shown on the abscissa, while the Bit Error Rate (BER) is shown on the ordinate. As shown, algorithm E, at BER 10⁻⁶, is just within 0.5 dB of the algorithms C and D. As also shown in FIG. 13, for algorithm C and D, at BER 10⁻⁶, the iterative algorithm is more than 2 dB better than the non-iterative one.

Algorithm E in FIG. 13 has undergone 10 iterations in total. Even after multiplying the complexity numbers in Table I for algorithm E by a factor of 10, the results are still smaller than the numbers for algorithms A and B. Algorithm E is 0.3% as complex as algorithm D with 5 iterations, but with a SNR loss of about 0.5 dB at BER 10⁻⁶ as shown in FIG. 13. Thus, algorithm E can be a good choice considering complexity and performance balance.

Figure 14:
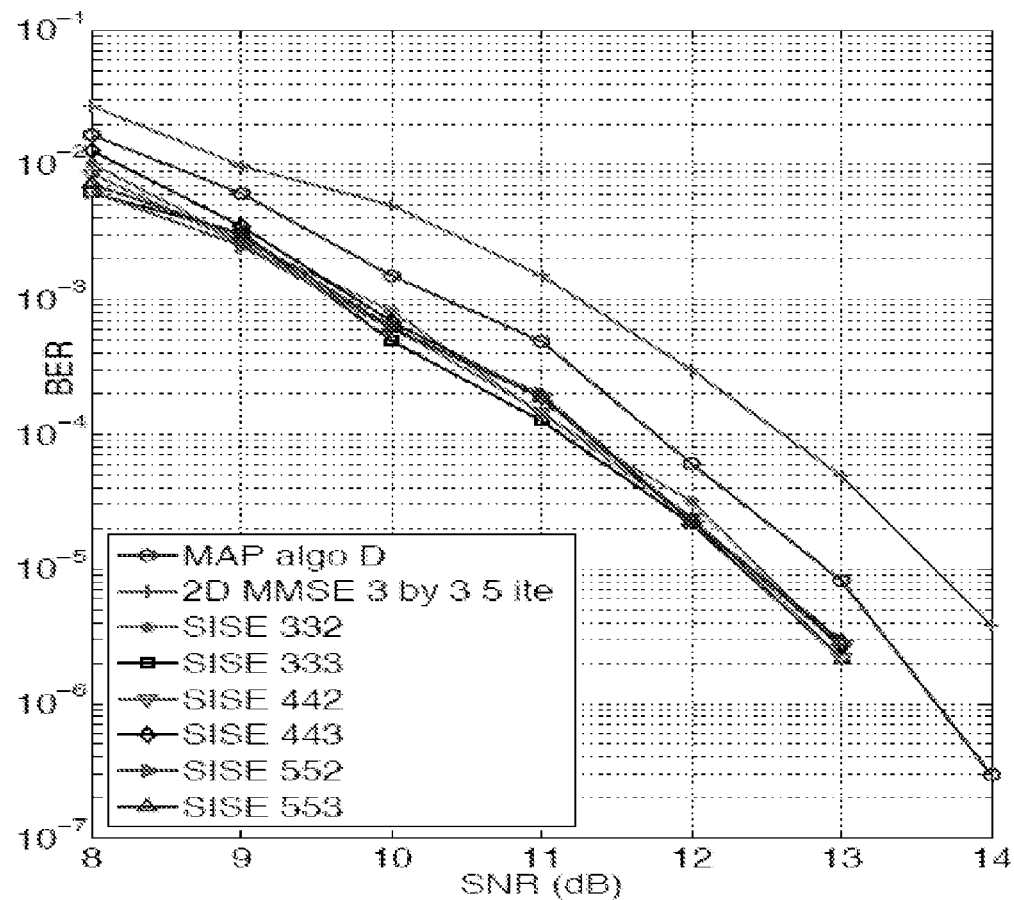
FIG. 14 is a graph showing the performance of a detector configured for joint 2-D equalization, according to one embodiment.

FIG. 14 is a graph showing the performance of a detector configured for joint 2-D equalization, according to one embodiment. Algorithm-D is the multi-track based row-column detector using a-priori for input and feedback pixels for processing. The notation "SISE xyz: in FIG. 14 means "x" inner iterations for the 2-D MMSE Linear Equalizer 602, "y" inner iterations for the Row-Column MAP detector 604, and "z" outer iterations between the 2-D MMSE Linear Equalizer 602 and the Row-Column MAP detector 604. As shown, the detector 600 configured for joint 2-D equalization exhibits an additional 0.5 dB gain to be realized over Algorithm-D, which is a MAP-based multi-track algorithm. As described herein, detectors such as the detector 600 configured for joint 2-D equalization may use 2-D alternative detectors such as, for example, soft output Viterbi algorithms or Max-log MAP detectors to realize nearly optimal joint equalization and 2-D detection. Moreover, detectors such as the detector 600 configured for joint 2-D equalization are broadly applicable to next generation recording systems like TDMR.

While certain embodiments of the inventions have been described, these embodiments have been presented by way of example only, and are not intended to limit the scope of the inventions. Indeed, the novel methods, devices and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual structures (such as, for example,) may differ from those shown in the figures. Depending on the embodiment, certain of the steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A disk drive comprising:
a processor configured to decode data written over a plurality of tracks of a disk using joint self-iterating soft equalization and an iterative turbo two-dimensional (2-D) maximum a-posteriori (MAP)-based detection, the processor being coupled to a memory and being configured to:
receive input samples from a data channel;
perform soft self-iterating linear 2-D minimum mean square error (MMSE) equalization on the received input samples;
provide a 2-D equalization filter having a predetermined order that defines a number of rows and columns;
compute MMSE estimates for coefficients of the provided 2-D equalization filter based on a-priori values, mean of the a-priori values, the 2-D equalization filter and the received input samples;
update the coefficients of the 2-D equalization filter using a variance based on the a-priori values when carrying out a first iteration and based on an extrinsic Log Likelihood Ratio (LLR) when carrying out second and subsequent iterations;
determine whether individual bits in the input samples are 0s or 1s using the updated coefficients;
compute an output LLR of each individual received sample based on the computed MMSE estimate, the mean and the variance, and
compute the extrinsic LLR by subtracting a priori LLR from the output LLR.

2. The disk drive of claim 1, wherein a-priori values are initialized to zero during the first iteration.

3. The disk drive of claim 1, wherein the processor is further configured to apply a scale factor that is less than 1 to the extrinsic LLR.

4. The disk drive of claim 1, wherein the processor is further configured to update the coefficients by at least one of:
adaptively using least mean squares algorithms; and
non-adaptively using a Weiner-Hopf equation.

5. The disk drive of claim 3, wherein the processor is further configured to feed the scaled extrinsic LLR to a MAP detector and scale an output of the MAP detector to generate the a-priori values.

6. The disk drive of claim 3, wherein the processor is further configured to feed the scaled extrinsic LLR to one of a 2-D detector, a soft output Viterbi algorithm and a Max-log MAP detector and scale an output thereof to generate the a-priori values.

7. The disk drive of claim 5, wherein for the MAP detector, the processor is further configured to:
select a mask configured to account for Inter-Symbol-Interference (ISI), the mask comprising selected channel coefficients and the mask defining a trellis defining a plurality of states;
generate equalized samples from the input samples, each of the equalized samples corresponding to an input pixel;
compute branch probabilities for each received input pixel based on a Gaussian noise distribution using the equalized samples and ideal samples;
compute forward and backward probabilities via recursions using the computed branch probabilities for each of the plurality of states of the trellis;
combine the computed forward probabilities, backward probabilities and the branch probabilities to generate a-posteriori probabilities;
marginalize the a-posteriori probabilities over values of neighboring pixels to generate an a-posteriori probability for a pixel in a given state; and
decode the pixel as a first logical state or a second logical state from the marginalized a-posteriori probabilities.

8. The disk drive of claim 7, wherein the processor is further configured to decode the pixel by:
summing each of the plurality of states of the trellis corresponding to the pixel assuming a value of +1 and summing each of the plurality of states of the trellis corresponding to the pixel assuming a value of −1;
calculating a ratio of a sum over all the states corresponding to pixels that are +1 and a sum of all states corresponding to pixels that are −1 to obtain an output pixel log likelihood ratio (LLR), and
decoding the current pixels as a 1 if the output pixel LLR is greater than 0 and decoding the current pixels as a 0 if the output pixel LLR is less than or equal to 0.

9. A computer-implemented method of decoding data written over a plurality of tracks of a disk of a disk drive using joint self-iterating soft equalization and an iterative turbo two-dimensional (2-D) maximum a-posteriori (MAP)-based detection, comprising:
receiving input samples from a data channel;
performing soft self-iterating linear 2-D minimum mean square error (MMSE) equalization on the received input samples;
providing a 2-D equalization filter having a predetermined order that defines a number of rows and columns;
computing MMSE estimates for coefficients of the provided 2-D equalization filter based on a-priori values, mean of the a-priori values, the 2-D equalization filter and the received input samples;
updating the coefficients of the 2-D equalization filter using a variance based on the a-priori values when carrying out a first iteration and based on an extrinsic Log Likelihood Ratio (LLR) when carrying out second and subsequent iterations;
determining whether individual bits in the input samples are 0s or 1s using the updated coefficients;
computing an output LLR of each individual received sample based on the computed MMSE estimate, the mean and the variance, and
computing the extrinsic LLR by subtracting a priori LLR from the output LLR.

10. The computer-implemented method of claim 9, further comprising initializing the a-priori values to zero during the first iteration.

11. The computer-implemented method of claim 9, further comprising applying a scale factor that is less than 1 to the extrinsic LLR.

12. The computer-implemented method of claim 9, wherein the coefficient updating is carried out at least one of adaptively using least mean squares algorithms and non-adaptively using a Weiner-Hopf equation.

13. The computer-implemented method of claim 9, further comprising feeding the scaled extrinsic LLR to a MAP detector, scaling an output of the MAP detector to generate the a-priori information.

14. The computer-implemented method of claim 9, further comprising feeding the scaled extrinsic LLR to one of a 2-D detector, a soft output Viterbi algorithm and a Max-log MAP detector and scaling an output thereof to generate the a-priori values.

15. The computer-implemented method of claim 13, wherein for the MAP detector, the method further comprises:
  selecting a mask configured to account for Inter-Symbol-Interference (ISI), the mask comprising selected channel coefficients and the mask defining a trellis that defines a plurality of states;
  generating equalized samples from the input samples, each of the equalized samples corresponding to an input pixel;
  computing branch probabilities for each received input pixel based on a Gaussian noise distribution using the equalized samples and ideal samples;
  computing forward and backward probabilities via recursions using the computed branch probabilities for each of the plurality of states of the trellis;
  combining the computed forward probabilities, backward probabilities and the branch probabilities to generate a-posteriori probabilities;
  marginalizing the a-posteriori probabilities over values of neighboring pixels to generate an a-posteriori probability for a pixel in a given state; and
  decoding the pixel as a first logical state or a second logical state from the marginalized a-posteriori probabilities.

16. The computer-implemented method of claim 15, wherein decoding further comprises:
  summing each of the plurality of states of the trellis corresponding to the pixel assuming a value of +1 and summing each of the plurality of states of the trellis corresponding to the pixel assuming a value of −1;
  calculating a ratio of a sum over all the states corresponding to pixels that are +1 and a sum of all states corresponding to pixels that are −1 to obtain an output pixel log likelihood ratio (LLR), and
  decoding the pixels as a 1 if the output pixel LLR is greater than 0 and decoding the pixels as a 0 if the output pixel LLR is less than or equal to 0.

* * * * *